May 14, 1929.　　　J. YUYAMA　　　1,713,208
CONTROL SYSTEM
Filed June 19, 1928
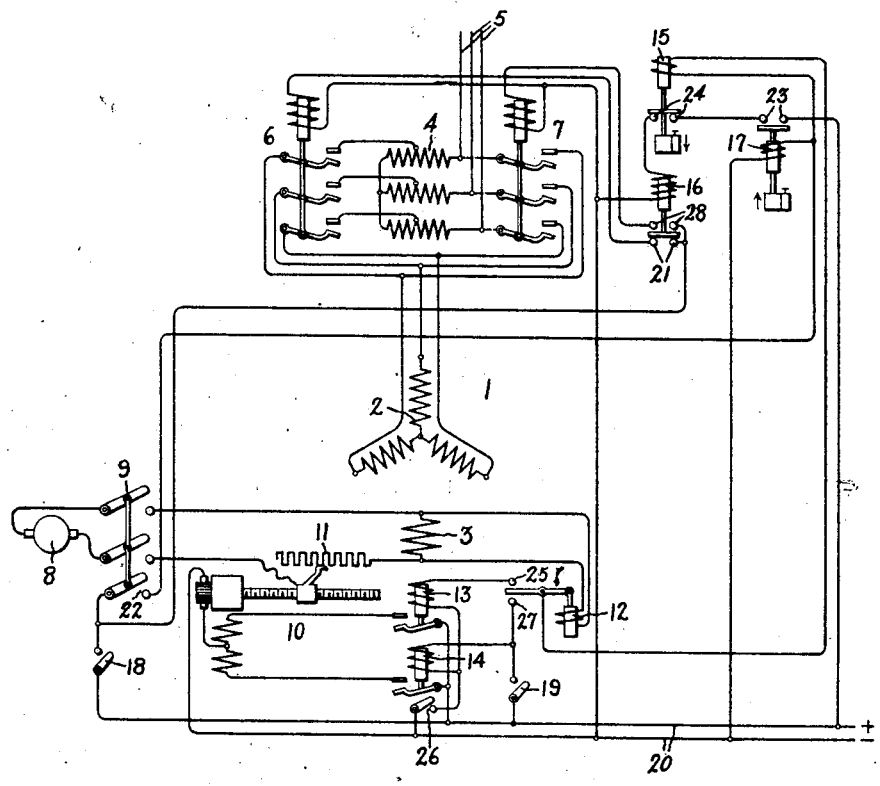
Inventor:
Juji Yuyama
by Charles E. Muller
His Attorney Patented May 14, 1929.

1,713,208

UNITED STATES PATENT OFFICE.

JUJI YUYAMA, OF EBARAGUN TOKYOFU, JAPAN, ASSIGNOR TO GENERAL ELECTRIC COMPANY, A CORPORATION OF NEW YORK.

CONTROL SYSTEM.

Application filed June 19, 1928, Serial No. 286,656, and in Japan July 5, 1927.

My invention relates to control systems and particularly to a system for starting synchronous machines such as a synchronous motor, synchronous converter, and the like.

Synchronous machines are usually started as induction machines by impressing a relatively low alternating current voltage upon the armature winding of the machine and when the machine has accelerated to approximately synchronous speed, the field winding of the machine is excited with direct current to pull the machine into synchronism and then normal operating voltage is impressed upon the armature winding.

One object of my invention is to provide an improved arrangement for controlling the transfer from the starting connections of the armature winding of the machine to the running connections after the motor has accelerated to approximately synchronous speed and the field winding has been excited with direct current to pull the machine into synchronism.

My invention will be better understood from the following description taken in connection with the accompanying drawing which is a diagram of a control system for a synchronous machine and its scope will be pointed out in the appended claims.

Referring to the accompanying drawing, 1 represents a synchronous motor comprising an armature winding 2 and a field winding 3. In order that a relatively low voltage may be impressed upon the armature winding 2 to start the motor I provide a compensator 4 which is connected to a suitable source of current, such as an alternating current supply circuit, 5 and a starting switch 6 which when closed connects the armature winding 2 to the low voltage terminals of the compensator 4. Normal operating voltage is arranged to be impressed upon the armature winding 2 by the closing of a running switch 7 which when closed connects armature winding 2 directly to the supply circuit 5.

The field winding 3 is arranged to be supplied with direct current from a suitable source of current, such as an exciter 8, when a field switch 9 is closed. As shown in the drawing this field switch 9 is manually controlled but it is obvious that any suitable control means, examples of which are well known in the art, may be provided for automatically closing the switch 9 at the proper time during the starting of the motor. For regulating the amount of exciting current supplied to the field winding 3 by the exciter 8 I provide a suitable regulator 10 which is arranged to maintain the field current constant at a predetermined value. As shown in the drawing the regulating means comprises a motor operated rheostat 11 and a current responsive relay 12 which is responsive to the current flowing through the field winding 3 and which is arranged to cooperate with the control relays 13 and 14 so as to operate the motor operated rheostat 11 in such a manner that the proper amount of resistance is in the circuit of the field winding to maintain the field current at the desired value.

In accordance with my invention I provide an arrangement whereby the starting switch 6 is opened and the running switch 7 is closed when the current through the field winding 3 remains at a predetermined value for a predetermined length of time. In the arrangement disclosed in the drawing this result is accomplished by means of the timing relay 15 which is arranged to be energized whenever the current responsive relay 12 is in a position to effect the operation of either of the control relays 13 and 14. Whenever the current responsive relay 12 is in a position in which it does not effect the operation of either of the control relays 13 and 14 the time relay 15 is deenergized and if it remains deenergized for a sufficient length of time it effects the operation of a transfer relay 16. The transfer relay, in turn, effects the opening of the starting switch 6 and the closing of the running switch 7.

In order to prevent the transfer relay 16 from effecting the transfer from the starting to the running connection during the starting operation and before the field switch 9 is closed a timing relay 17 is provided which controls the circuit of the transfer relay 16 so that this relay can only operate after the field switch 9 has been closed for a predetermined length of time. 18 and 19 represent suitable control switches for controlling the synchonous motor.

The operation of the arrangement shown in the drawing is as follows: Preferably before the motor is started, the control switch 19 is closed for a short time so that the circuit of the control relay 14 will be completed across a suitable control circuit 20 to cause the motor operated rheostat to be operated to insert resistance in the field circuit of the machine in order that only a small exciting current will flow through the field winding when the field switch 9 is closed.

When it is desired to start the motor the control switch 18 is closed. The closing of the control switch 18 completes through the contacts 21 of the transfer relay 16 a circuit for the starting switch 6 across the control circuit 20. The closing of the starting switch 6 connects the armature winding 2 of the motor 1 to the low voltage terminals of the compensator 4 so that a relatively low voltage is impressed upon the armature winding. The motor then starts as an induction motor and comes up to approximately synchronous speed. After the motor has reached substantially synchronous speed the field switch 9 is closed so that the field winding 3 is connected to the exciter 8. The closing of the auxiliary contacts 22 of the field switch 9 connects the coil of the time relay 17 across the control circuit 20. After a predetermined time the time relay 17 closes its contacts 23 which are in the circuit of the transfer relay 16. Before these contacts are closed, however, the relay 15 is energized so that it opens its contacts 24 in the circuit of the transfer relay 16. After the field switch 9 is closed the current responsive relay 12 operates to energize either the control relay 13 or the control relay 14 so as to cause the motor operated rheostat 10 to be operated to maintain the field current of the motor at a predetermined value. When the field current is below the predetermined value the circuit for the control relay 13 is completed from one side of the control circuit 20 through the control switch 18, auxiliary contacts 22 of the field switch 9, coil of relay 15, contacts 25 of the current relay 12, coil of relay 13, contacts 26 of relay 14 to the other side of the control circuit. When the field current is above the predetermined value the contacts 27 of the current relay 12 are closed so that the relay 15 and control relay 14 are connected in series. The time relay 15 is of any suitable construction so that when it is energized it immediately opens its contacts 24 but does not close its contacts 24 until after the coil of the relay has been deenergized for a predetermined length of time. Therefore, as soon as the field switch 9 is closed the relay 15 operates to open its contacts 24 and maintains these contacts open until the field current remains constant at the predetermined value for a predetermined length of time. When the relay 15 closes its contacts 24 after the field switch 9 is closed a circuit is completed for the transfer relay 16. This circuit is from one side of the control circuit 20 through contacts 23 of time relay 17, contacts 24 of time relay 15, coil of relay 16 to the other side of the control circuit. The energization of the relay 16 effects the opening of the contacts 21 so that the starting switch 6 is open and the armature winding 2 is disconnected from the low voltage terminals of the compensator 4 and effects the closing of the contacts 28 which are in the circuit of the closing coil of the running switch 7. This circuit is from one side of the control circuit 20 through the control switch 18, contacts 28 of the transfer relay 16, closing coil of switch 7 to the other side of the control circuit. The energization of the closing coil of the switch 7 closes the switch 7 so that the armature winding 2 is connected directly to the source of current 5.

It will be observed that in accordance with my invention the transfer from the starting to the running connection is effected only after the field current has remained constant at a predetermined value for a predetermined length of time.

While I have in accordance with the patent statutes shown and described my invention as applied to a particular system and as embodying various devices diagrammatically indicated, changes and modifications will be obvious to those skilled in the art and I, therefore, aim in the appended claims to cover all such changes and modifications as fall within the true spirit and scope of my invention.

What I claim as new and desire to secure by Letters Patent of the United States is:

1. In combination, a synchronous dynamo electric machine having a field winding, a source of relatively low alternating current voltage connected to said machine, a source of relatively high alternating current voltage, means for supplying exciting current to said field winding, regulating means for controlling the amount of exciting current in said field winding, and means controlled by said regulating means for effecting the disconnection of said machine from said relatively low voltage source and the connection of said machine to a said relatively high voltage source when the exciting current remains constant at a predetermined value for a predetermined time.

2. In combination, a synchronous dynamo electric machine having a field winding, a source of relatively low alternating current connected to said machine, a source of relatively high alternating current voltage, a source of exciting current, switching means for connecting said exciting current source to said field winding, means operative in response to the closing of said switching means for regulating the amount of current in said field winding, and means controlled by said regulating means for effecting the disconnection of said machine from said relatively low voltage source and the connection of said machine to said relatively high voltage source when the exciting current remains constant at a predetermined value for a predetermined time.

3. In combination, a synchronous dynamo electric machine having a field winding, a source of relatively low alternating current voltage connected to said machine, a source of relatively high alternating current voltage, a source of exciting current connected to said field winding, and means responsive to the exciting current supplied to said machine by said source of excitation for regulating the exciting current and for effecting the disconnection of said machine from said source of relatively low voltage and the connection of said machine to said source of relatively high voltage.

4. In combination, a synchronous dynamo electric machine having a field winding, a source of relatively low alternating current voltage connected to said machine, a source of relatively high alternating current voltage, means for supplying exciting current to said field winding, regulating means responsive to the exciting current of said machine for maintaining the exciting current at a predetermined value and timing means controlled by said regulating means for effecting the disconnection of said machine from said source of relatively low voltage and the connection of said machine to said source of relatively high voltage.

In witness whereof, I have hereunto set my hand this twenty-eighth day of May, 1928.

JUJI YUYAMA.